Jan. 10, 1961 A. C. GLENN 2,967,323
LOCKING MECHANISM FOR MACHINE TOOL CONTROL DEVICE
Filed Jan. 26, 1959 3 Sheets-Sheet 3

INVENTOR.
ASHLEY C. GLENN

BY
ATTORNEYS

United States Patent Office 2,967,323
Patented Jan. 10, 1961

2,967,323

LOCKING MECHANISM FOR MACHINE TOOL CONTROL DEVICE

Ashley C. Glenn, Cincinnati, Ohio, assignor to The Cincinnati Milling Machine Co., Cincinnati, Ohio, a corporation of Ohio Filed Jan. 26, 1959, Ser. No. 789,158

4 Claims. (Cl. 51—233)

The present invention relates to a mechanism having two rotatable control elements which can be set to determine the respective limits of movement of a member on a machine tool and more particularly to a locking mechanism to assure that the appropriate control element is set to establish each of the movement limits.

A machine tool having two rotatable elements which can be dialed to establish the respective limits of movement of a reciprocating member, such as a table, is disclosed in the copending application of Ashley C. Glenn and Albert H. Dall, entitled Surface Grinding Machine, Serial No. 581,213, filed April 27, 1956, now U.S. Patent 2,933,858. In operating a device of this type confusion sometimes arises as to which rotatable element establishes which limit of table movement. Such a device is properly set by manually moving the table to one position, say the right hand position, at which it is desired to reverse the table and then setting the rotating element corresponding to the right hand position to a zero setting. Then the table is manually moved in the opposite direction to the left hand limit of its desired reciprocating stroke and the other rotating element is set to a zero position. It sometimes may happen, however, that after manual movement of the table to the desired right hand limit of the stroke, the operator will set the control element corresponding to the left hand limit.

In order to avoid this possibility a locking mechanism is provided by the present invention which permits the setting of one control element to a zero position only after the table has been moved toward the limit position corresponding to that element and which permits the setting of the other control element only after the table has been moved in the opposite direction toward the limit position corresponding to said other element.

It is therefore an object of the present invention to provide a locking mechanism for a device by which the respective limits of a stroke are dialed by two rotatable elements to assure setting the appropriate rotatable element.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

In the drawings:

Fig. 7 is a view taken on line 7—7 of Fig. 2; and

Fig. 8 is a view taken on line 8—8 of Fig. 2.

Figure 1:
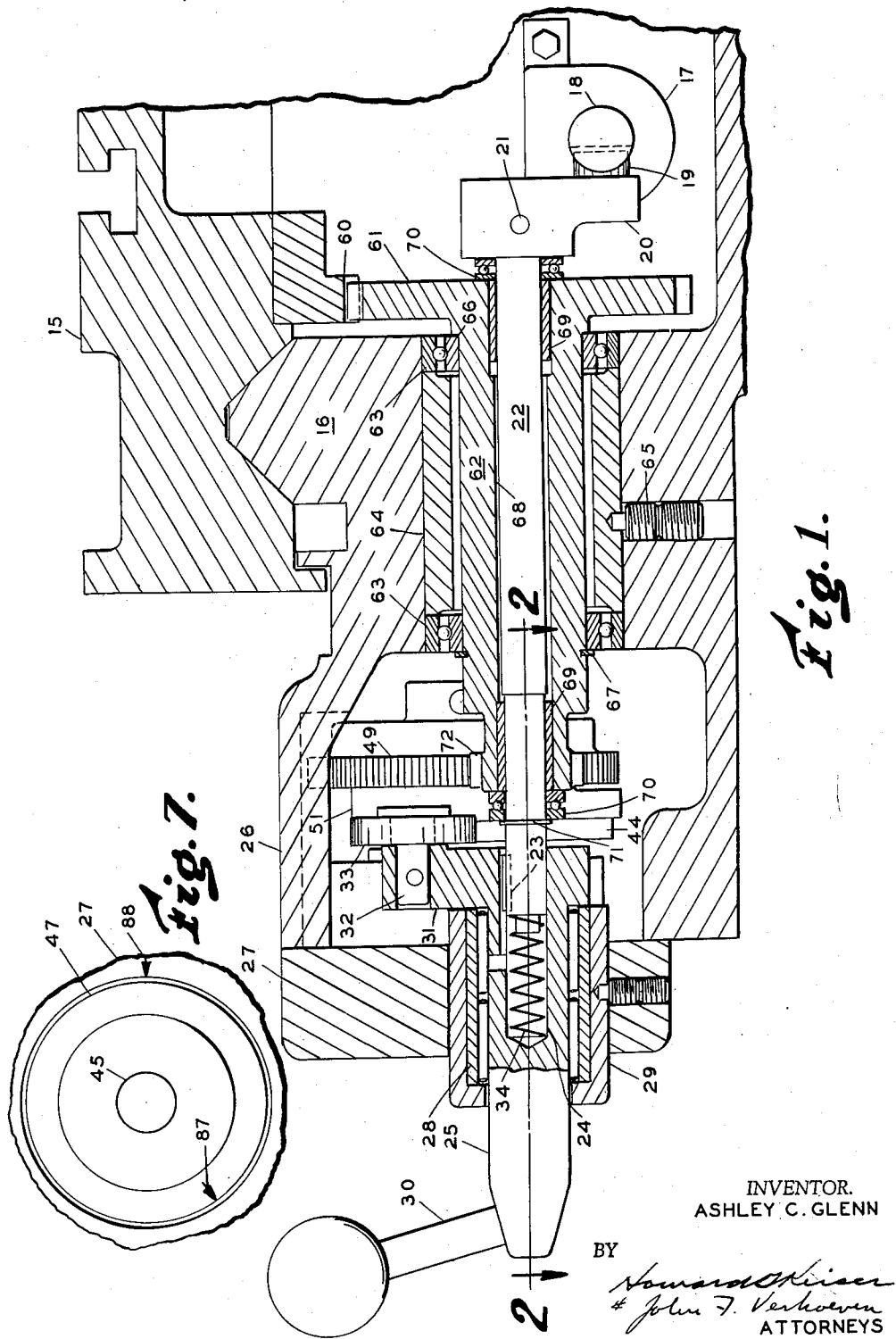
Fig. 1 is a cross-sectional view in side elevation of the stroke limit setting device.

The present invention is shown in conjunction with a surface grinder machine of the type shown and described in U.S. Patent 2,360,671, dated October 17, 1944. As shown in Fig. 1, the machine has a reciprocating table member 15 which is moved on base 16 of the machine by hydraulic means including valve 17 which operates when actuated to reverse the direction of movement of the table at the end of its stroke. The valve 17 has a plunger 18 which is engaged by pin 19 on crank arm 20. The crank arm 20 is pinned at 21 to the rear end of shaft 22, the forward end of which is slidably received in bore 24 of shaft 25 and keyed thereto at 23. A housing 26 integral with base 16 includes a detachable front plate 27 constituting a support for the mechanism within the housing. The shaft 25 is received in a roller bearing 28 snugly secured in sleeve 29 which is mounted in an opening in front plate 27. The shaft 25 extends through the sleeve 29 and has a lever 30 thereon outside the housing at the front of the machine. The shaft 25 has an arm 31 within the housing extending outwardly from the shaft. The arm 31 has at its outward end a rearwardly extending pin 32 which rotatably carries roller 33. A spring 34 in bore 24 and engaged with the front end of shaft 22 normally urges shaft 25 forwardly to a position where arm 31 engages sleeve 29. The roller 33, pin 32, arm 31, the keyed shafts 25 and 22, the crank arm 20, and pin 19, define a lever to actuate valve 17 as the roller 33 is moved between the positions shown in solid lines and dotted lines in Fig. 3.

Figure 2:
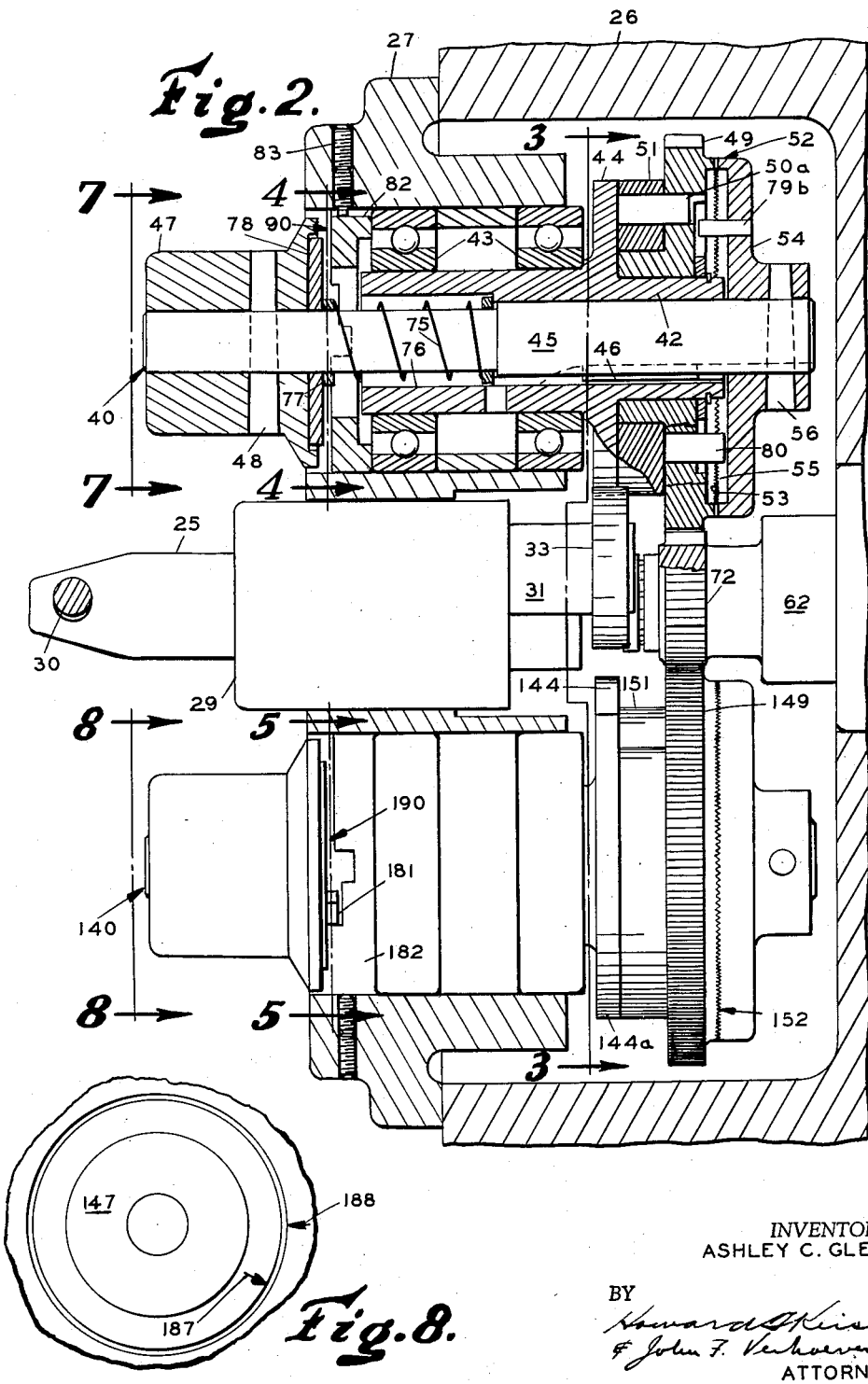
Fig. 2 is a top plan view, partly in cross-section, of the device through line 2—2 of Fig. 1.
Figure 3:
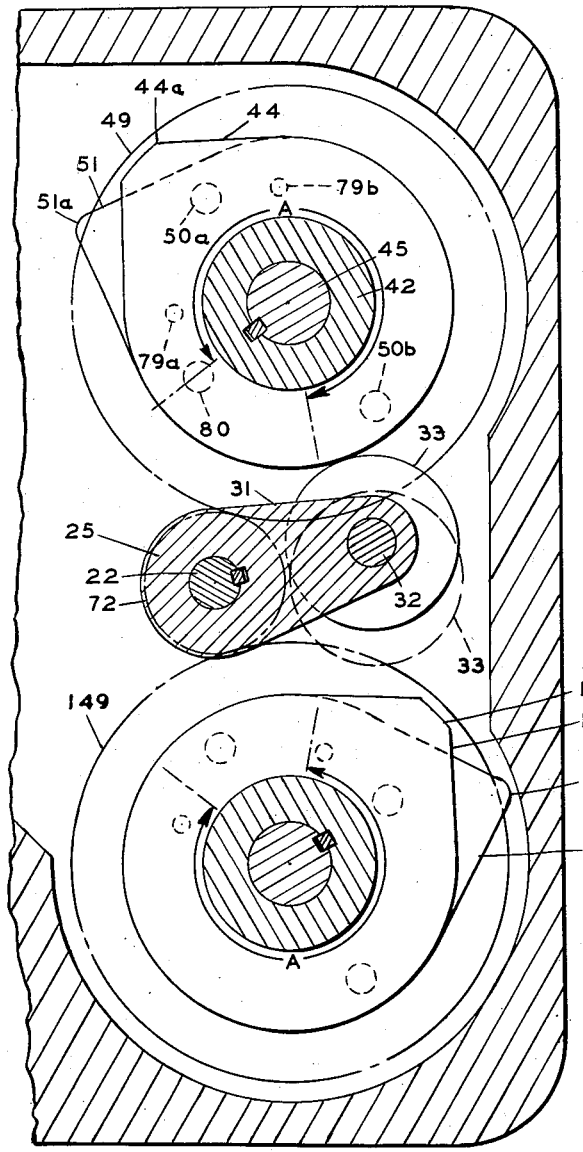
Fig. 3 is a view taken on line 3—3 of Fig. 2.

Tripping of the roller 33 between the positions shown in solid and dotted lines in Fig. 3 is accomplished by alternate engagement of the roller with two elements shown generally at 40 and 140 rotatably mounted on each side of the roller 33. As shown in Fig. 2 sleeve 42 of element 40 is rotatably mounted in support plate 27 by ball bearings 43 and has a cam 44 integral therewith inside the housing 26. A shaft 45 of element 40 is slidably received in the sleeve 42 and is keyed thereto at 46. The rotatable element 40 also includes a knob 47 pinned at 48 to shaft 45 at the forward end thereof outside the housing 26.

A gear 49 is loosely received on sleeve 42 behind cam 44 and has connected to its forward face by pins 50a and 50b a cam 51 for rotation therewith. In Fig. 2 pin 50a is shown out of its true position, shown in Fig. 3, for clarity. The gear 49 constitutes one member of a clutch, designated generally as 52, and has an annular ring of clutch teeth 53 on the rear face thereof. The other member of clutch 52 is a disc 54 having clutch teeth 55 on the front face thereof and pinned to shaft 45 at 56. The element 140 is similar to element 40 and will not be described in detail. As will be described hereafter, gear 49 which rotates element 40 when clutch 52 is engaged and the corresponding gear 149 which rotates element 140 when clutch 152 is engaged are operatively connected at all times to table 15.

The motion transmitting means by which the elements 40 and 140 are normally connected to the movable member 15 includes a rack 60 connected to said table member 15 which is engaged with pinion 61 having a sleeve 62 integral therewith. Sleeve 62 is rotatably mounted in base 16 by ball bearings 63 separated by spacer 64 which is secured in the base 16 by set screw 65. Axial movement of sleeve 62 in base 16 is prevented by shoulder 66 on sleeve 62 abutting against the rear face of rear bearing 63 and locking ring 67 in engagement with sleeve 62 abutting against the forward face of forward bearing 63. The sleeve 62, which has an axial bore 68, provides a support for shaft 22 which is rotatably received in bushings 69 mounted in the bore 68. Thrust ball bearings 70 are sandwiched between the rear face of sleeve 62 and the crank arm 20 pinned to the rear end of shaft 22 and between the forward end of sleeve 62 and locking ring 71 engaged with shaft 22. The sleeve 62 has at its forward end pinion 72 integral therewith which is engaged with the gears 49 and 149, loosely carried on the rotatable elements 40 and 140, respectively.

The gearing operatively connecting the table 15 and gear 49 causes the gear 49 and the cam 51 carried thereby to rotate less than 360° as the table moves between the extreme permissible limits of its stroke. Gear 149 is simultaneously driven a corresponding amount, rotating clockwise when gear 49 rotates clockwise and rotating counterclockwise when gear 49 rotates counterclockwise. Normally the roller 33 is in registration with cam 44 and the corresponding cam 144 of element 140 but if lever 30 is manually pushed rearwardly against spring 34 the roller will be shifted rearwardly to a position where it is in registration only with cam 51 and the corresponding cam 151. This may be done, for example, when it is desired to have the table travel its full permissible maximum stroke without disturbing the setting of cams 44 and 144 which establish the adjustable limits of movement of the table as described hereafter. When the roller 33 is so shifted it will be evident that shoulders 51a and 151a on cams 51 and 151, respectively, alternately trip roller 33 to establish the maximum stroke limits of the table. The rotation of cam shoulder 51a, and the rotation of cam shoulder 151a, is shown by arrows A on Fig. 3 when the table moves between its maximum limits and is reversed by operation of cams 51 and 151.

The mechanism may be set, however, so that roller 33 is tripped with less table movement than is required when the valve is tripped by the cams carried by gears 49 and 149. A spring 75 encircling shaft 45 is received in bore 76 of sleeve 42. The forward end of spring 75 is engaged with washer 77 to hold a locking member 78, which is rotatably received on shaft 45, against knob 47 and to urge the knob and shaft 45 forwardly relative to sleeve 42. Thus clutch 52, one member 54 of which is pinned to shaft 45, is normally held engaged by spring 75, but knob 47 can be pushed rearwardly to disengage clutch 52 and the shaft 45 can then be rotated relative to gear 49. Therefore cam 44, which is keyed to shaft 45, can be angularly adjusted relative to gear 49. Pins 79a and 79b, mounted in clutch member 54 and extending forwardly therefrom, travel in the same orbital path as pin 80, which is mounted in gear 49 and extends rearwardly therefrom. Therefore these pins limit the permissible relative adjustment of cam 44 (which rotates with clutch member 54) relative to gear 49 and cam 51 connected thereto.

If the valve 17 operates to move table 15 away from the viewer in Fig. 1 (to the left as viewed from the front of the machine) when the roller 33 is to the left and in the position shown in solid lines in Fig. 3, the movement of the table will drive pinion 72 counterclockwise as viewed in Fig. 3. This will drive both gears 49 and 149 clockwise when the clutch 52, and the corresponding clutch 152 associated with element 140, are both engaged. If the shaft 25 is in its normal axial position with roller 33 in registration with cams 44 and 144, and if cam 44 is angularly positioned relative to gear 49 and cam 51 connected thereto as shown in Fig. 3, the shoulder 44a will trip roller 33 to the position shown in dotted lines before the table reaches its maximum permissible left hand position. This, of course, reverses the table and causes pinion 72 to rotate clockwise and cams 44 and 144 to rotate counterclockwise. Thus shoulder 144a of cam 144 will trip roller 33 back to the position shown in solid lines before the table reaches its maximum right hand position. It will be evident that the left hand element 40 will establish the left hand limit of movement of the table while the right hand element 140 establishes the right hand limit of movement of the table. Cam 44 can be adjusted when the table is stopped and clutch 52 disengaged relative to gear 49 within the limits permitted by pins 79, 79b, and 80 to vary the left hand end position of the table stroke. Similarly, cam 144 can be adjusted to vary the right hand limit of the table stroke.

In order to assure that in setting the mechanism to establish one limit of the table movement, the appropriate element 40 or 140 corresponding to that particular limit is adjusted, and not the other element, locking elements designated generally as 90 and 190, associated with elements 40 and 140 respectively, are provided. The locking element 90 permits relative adjustment of cam 44 of element 40 relative to gear 49 only after the table has been moved toward the limit position established by adjustment of element 40 (the left hand position) and locking element 190 prevents adjustment of element 140 after such movement. Conversely, locking element 190 permits adjustment of element 140 only if the table is moved toward the position that element 140 controls (the right hand position) and locking element 90 prevents adjustment of element 40 after movement toward that position.

Figure 6:
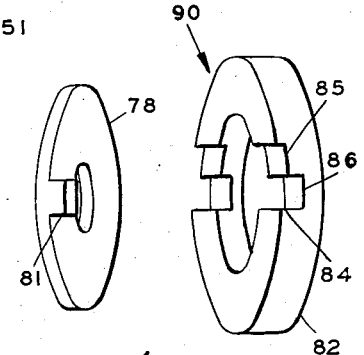
Fig. 6 is a perspective view of the male and female members of the locking element.

The locking element 90 has a male locking member 78 having a lug 81 protruding from its rear face (see Fig. 6). The locking member 78, which is carried on shaft 45 and urged against knob 47 by spring 75, is frictionally engaged with shaft 45 by virtue of its contact with knob 47 which is pinned to the shaft, and will rotate with the shaft unless otherwise restrained. The locking element 90 includes also a female annular locking member 82 secured in the front support plate 27 by set screw 83. The locking member 82 encircles shaft 45 behind locking member 78 and in alignment therewith. The female locking member has a stepped groove 84 across a diameter thereof comprising a shallow slot 85 and a deeper slot 86. The lug 81 is always held in groove 84, but the rotatable locking member 78 can rotate relative to the fixed locking member 82 so that the lug 81 is shifted between the shallow slot 85 and the deep slot 86. When the lug 81 is engaged with shallow slot 85 shaft 45 cannot be manually pushed rearwardly and clutch 52 cannot therefore be disengaged. When the locking member 78 is rotated into mating engagement with member 82, with lug 81 in registration with the deep slot 86, shaft 45 can be pushed rearwardly and clutch 52 disengaged to permit relative rotation of cam 44 to gear 49 for adjustment of the corresponding limit of table movement. The locking element 190 is similar to locking element 90 except that the female member 182 thereof is secured in support 27 180° from the orientation of the corresponding member 82 of locking element 90.

Figure 4:
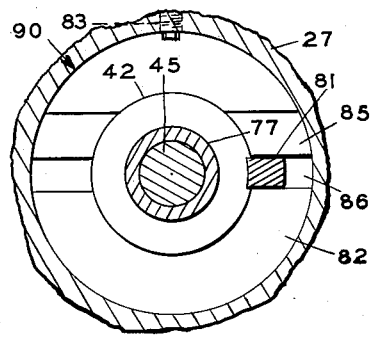
Fig. 4 is a view taken on line 4—4 of Fig. 2.
Figure 5:
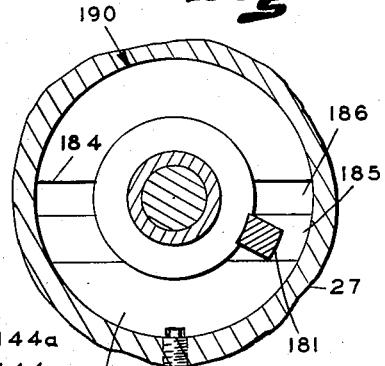
Fig. 5 is a view taken on line 5—5 of Fig. 2.

Table movement to the left will rotate knob 47 clockwise and hence rotate lug 81 clockwise in groove 84 into registration with deep slot 86, as shown in Fig. 4, so that after movement of the table to the left, the table can be stopped and the left hand table limit adjusted by element 40. Similarly, during movement of the table to the right, knob 147 is rotated counterclockwise and lug 181 of locking element 190 is rotated counterclockwise within groove 184 thereof, from registration with shallow slot 185 as shown in Fig. 5, into mating registration with deep slot 186 so that when the table is stopped the right hand limit of table adjustment can be set.

In operation the table is moved manually in one direction, say to the left, by a hand wheel operatively connected to the table rack by conventional means such as shown in U.S. Patent 2,360,671. The table is moved to the selected left hand limit of the desired table stroke. By virtue of this movement of the table to the left element 40 can be disengaged from gear 49 and rotated relative thereto while element 140 cannot be so adjusted. The knob 47 has an index mark 87, and support plate 27 has an associated index mark 88, as shown in Fig. 7, The mark 88 may be at the same angular position that roller 33 contacts cam 44 (which is a fixed position), and the mark 87 may be at the same angular position as the shoulder 44a of cam 44, so that when the element 40 is adjusted relative to gear 49 to align the marks 87 and 88 the shoulder 44a will be in a tripping position relative to the roller 33. Thus, whenever the table reaches this position the roller will be tripped to reverse movement of the table. It will be evident that both index marks can be displaced an equal angular amount from the positions described above, as are the marks in Figure 7, without altering their operation.

It will be noted that after element 40 is adjusted and knob 47 released, spring 75 will urge the locking member 78 away from the locking member 82 as it urges knob 47 forwardly and urges clutch 52 into engagement. Lug 81 remains in groove 84 but is now free to rotate from registration with slot 86 to registration with slot 85 when the table is moved to the right. After the left hand limit has been set the table is moved manually to the right and stopped at the desired right hand limit of table movement. At this time element 40 cannot be adjusted, since lug 81 is in shallow slot 85, but lug 181 has been rotated by movement of the table into mating registration with deep slot 186, and the right hand limit can be set by aligning index marks 187 and 188.

What is claimed is:

1. In a machine tool having a movable table member and control means including a valve operable when actuated to reverse the direction of movement of said table member, the combination comprising a support, a pair of elements rotatably mounted in said support, each of said elements including a cam operable in a predetermined position to actuate said control means, a normally engaged clutch connected to each element, motion transmitting means connecting the movable table member and the elements through the clutches to rotate said elements in a clockwise direction in response to movement of the movable table member in one direction and to rotate said elements in a counterclockwise direction in response to movement of the movable table member in the opposite direction, a pair of locking elements each having a first locking element member fixed in the support and a second locking element member engaged with the control means actuating elements, respectively, for rotation thereby relative to said first locking element member, the second locking element member engaged with one of said control means actuating elements rotating to a locking position when said elements rotate in a clockwise direction and the second locking element member member engaged with the other of said elements rotating to a locking position when said elements rotate in a counterclockwise direction, and means manually to disengage the clutches whereby each of the control means actuating elements may be rotated to change the position of the cam carried thereby relative to said control means when the locking member engaged therewith is rotated out of its locking position.

2. In a grinding machine having a base, a table movably mounted on said base, and a valve operable when actuated to reverse the direction of movement of said table, the combination of a support carried by the base, a lever rotatably carried in the support and operatively connected to the valve to actuate said valve when tripped, a pair of axially movable shafts rotatably mounted in said support, a cam carried on each of said shafts operable in a predetermined position to trip said lever, motion transmitting means including a clutch having associated members connecting the table to each of the shafts when the associated clutch members are engaged to rotate said shafts clockwise as the table moves in one direction and to rotate said shafts counterclockwise as the table moves in the opposite direction, one of the clutch members of each clutch carried by the shaft and disengageable from its associated clutch member by axial movement of the shaft in one direction, a locking element associated with each shaft having a male member and a female member, one of said locking element members carried by the shaft and frictionally engaged therewith for rotation by the shaft and the other fixed in the support in said one direction from the rotating member carried by the shaft, the rotating locking element member on one of said shafts rotating into mating registration with its fixed locking element member when said shafts rotate clockwise and the rotating locking element member on the other shaft rotating into mating registration with its fixed locking element member when said shafts rotate counterclockwise, whereby one of said shafts only can be manually moved in said one direction for disengagement of the clutch and rotation of the shaft to change the position of the cam carried by said shaft relative to the lever after movement of the table in one direction and the other of said shafts only can be manually moved in said one direction for disengagement of the clutch and rotation of the shaft to change the position of the cam carried by said shaft relative to the lever after movement of the table in the opposite direction.

3. In a machine tool having a movable table member and control means operable when actuated to reverse the direction of movement of said table member, the combination comprising a pair of rotatable elements each operable on rotation to a predetermined position to actuate said control means, motion transmitting means including a normally engaged clutch normally connecting each of said elements to the table for rotation in response to movement thereof, a first locking element responsive to movement of the table member in one direction to prevent disengagement of one of said clutches, and a second locking element responsive to movement of the table in the opposite direction to prevent disengagement of the other of said clutches.

4. In a machine tool having a movable table member and control means operable when actuated to reverse the direction of movement of said table member, the combination comprising a pair of rotatable elements each operable on rotation in a predetermined direction to a predetermined position to actuate said control means, motion transmitting means including a normally engaged clutch to rotate each of said elements in response to movement of the table member, one of said elements rotating in its predetermined direction when the table member moves in one direction and the other of said elements rotating in its predetermined direction when the table member moves in the opposite direction, a first locking member shiftable to a locking position in response to rotation of said one element in a direction opposite to its predetermined direction to lock the clutch through which said one element is rotated and prevent disengagement thereof, a second locking member shiftable to a locking position in response to rotation of said other element in a direction opposite to its predetermined direction to lock the clutch through which said other element is rotated and prevent disengagement thereof, means selectively to disengage the clutch through which said one element is rotated when said first locking member is not in its locking position, and means selectively to disengage the clutch through which said other element is rotated when said second locking member is not in its locking position.

References Cited in the file of this patent

FOREIGN PATENTS 101,122  Great Britain ---------- Aug. 17, 1916